United States Patent
Dhoolam et al.

(10) Patent No.: US 10,216,534 B1
(45) Date of Patent: Feb. 26, 2019

(54) MOVING STORAGE VOLUMES FOR IMPROVED PERFORMANCE

(71) Applicant: Amazon Technologies, Inc., Reno, NV (US)

(72) Inventors: Surya Prakash Dhoolam, Seattle, WA (US); Mitchell Gannon Flaherty, Seattle, WA (US); Christopher Magee Greenwood, Seattle, WA (US); Gary Michael Herndon, Jr., Seattle, WA (US); Rahul Karnik, Seattle, WA (US); Sriram Venugopal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 222 days.

(21) Appl. No.: 14/968,354

(22) Filed: Dec. 14, 2015

(51) Int. Cl.
G06F 9/455 (2018.01)
G06F 3/06 (2006.01)

(52) U.S. Cl.
CPC ........ *G06F 9/45558* (2013.01); *G06F 3/0605* (2013.01); *G06F 3/067* (2013.01); *G06F 3/0631* (2013.01); G06F 2009/45579 (2013.01); G06F 2009/45583 (2013.01); G06F 2009/45595 (2013.01)

(58) Field of Classification Search
None
See application file for complete search history.

(56) References Cited

U.S. PATENT DOCUMENTS

| 8,725,967 B2 * | 5/2014 | DeSantis | G06F 11/1464 711/161 |
| 2003/0204597 A1 * | 10/2003 | Arakawa | G06F 3/0605 709/226 |
| 2010/0036851 A1 * | 2/2010 | Paterson-Jones | G06F 17/30067 707/636 |
| 2010/0037031 A1 * | 2/2010 | DeSantis | G06F 11/1464 711/162 |
| 2010/0153947 A1 * | 6/2010 | Haruma | G06F 9/45558 718/1 |
| 2013/0097377 A1 * | 4/2013 | Satoyama | G06F 3/0605 711/114 |
| 2015/0242148 A1 * | 8/2015 | Suzuki | G06F 3/0619 711/114 |
| 2017/0147449 A1 * | 5/2017 | DeSantis | G06F 11/1464 |

* cited by examiner

*Primary Examiner* — Diem K Cao
(74) *Attorney, Agent, or Firm* — Hogan Lovells US, LLP

(57) ABSTRACT

Data volumes hosted for customers in a multi-tenant environment can be moved advantageously throughout the environment to improve performance and reduce cost. A data volume can serve I/O for a virtual machine instance, and it can be advantageous for the virtual machine and the data volume to be in the same network locality, or share at least some of the same network state and interconnection. Since there is limited capacity in a network locality, data volumes not attached to virtual machines can be moved to other locations in the environment. This can include moving data volumes to other local network topologies or snapshotting data volumes and writing the snapshots to another storage service. If the data volume is again needed for I/O, the data volume can moved, allocated, or reattached as necessary.

20 Claims, 8 Drawing Sheets

# US 10,216,534 B1

MOVING STORAGE VOLUMES FOR IMPROVED PERFORMANCE

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. Multiple users can share resources such as remote servers and data repositories, wherein the users can concurrently send multiple requests to be executed against the same resource. The resources can be physical resources or virtual resources provided through virtualization.

Virtualized computing environments are frequently supported by block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. In order to provide for data redundancy and reduce the likelihood of data loss, many data volumes are replicated with two copies. If these data volumes are not actively receiving input or generating output, then these data volumes might be occupying space on a set of resources that could be more optimally utilized for active data volumes. Further, causing active data volumes to be positioned on other resources may provide less optimal performance based upon factors such as the distance and number of connections necessary between those resources.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the aforementioned and other deficiencies experienced in conventional approaches to managing aspects of resource sharing and allocation in an electronic environment. In particular, various embodiments provide for the movement of data volumes between local network topologies in order to improve performance and reduce cost. In various embodiments, a data volume will serve input and/or output (I/O) operations for a virtual machine instance, or other such resource, executing on a server in a multi-tenant environment. It can be advantageous for the server hosting the virtual machine and the server hosting the data volume, which is connected or attached to the virtual machine, to be in the same network locality, having some of the same local topology and/or sharing at least some of the same network state and interconnection, among other such aspects. For example, network localities can include components located in the same brick (e.g., connected by the same top of rack switch), rack, region of network interconnect, server cluster, and the like. Since there will be limited capacity in a network locality to host data volumes, data volumes that are not attached to a virtual machine or otherwise not processing I/O for a period of time can be moved to other locations in the multi-tenant environment. This can include, for example, moving the data volume to another network locality or snapshotting the data volume and writing the snapshot to another storage service, among other such options. If the data volume is again needed for I/O, the data volume can be addressed from the other local network locality, moved back to the original network locality, or a new volume created from the snapshot, among other such options.

Figure 1:
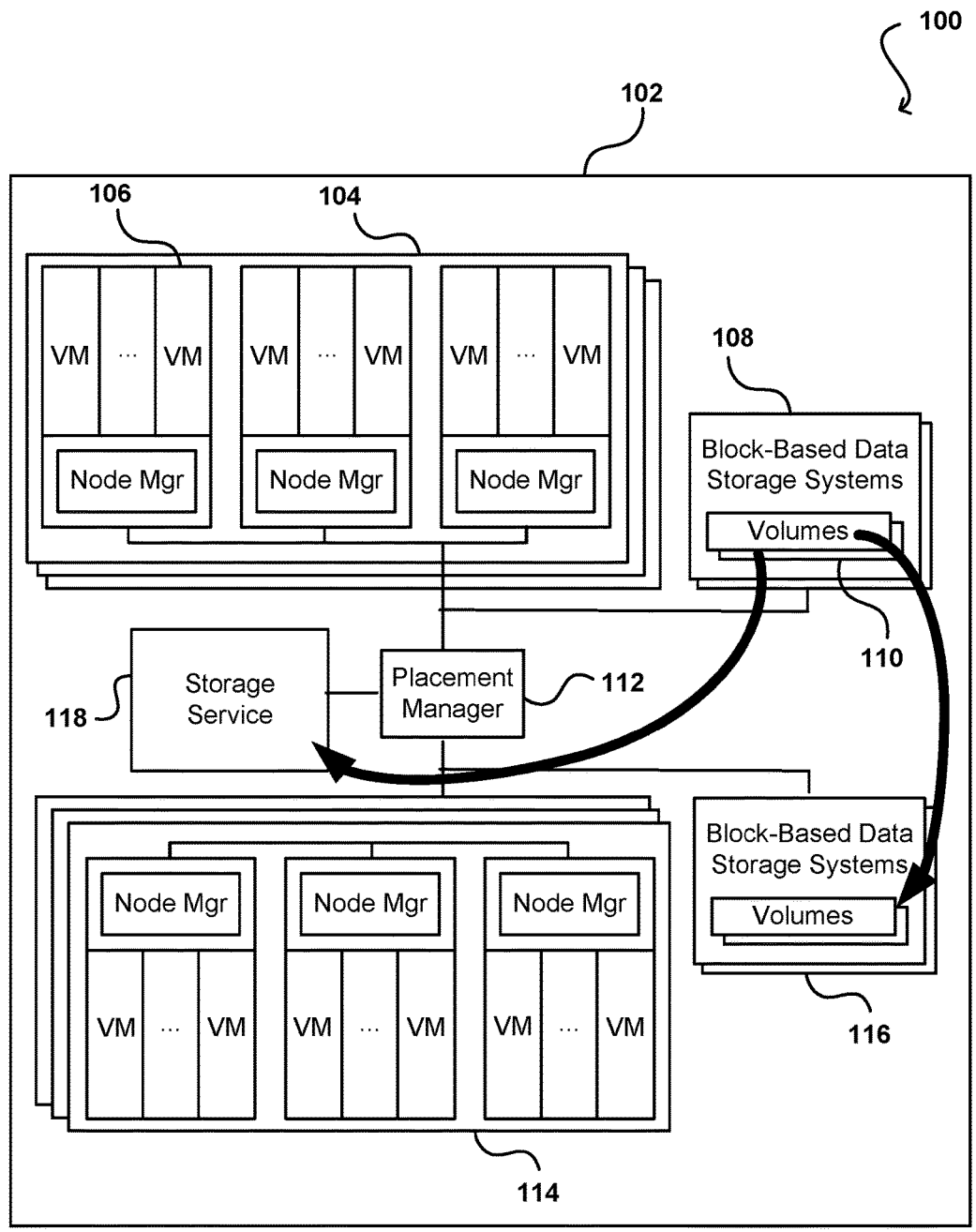
FIG. 1 illustrates an example approach to migrating data volumes that can be utilized in accordance with various embodiments.

FIG. 1 illustrates an example network configuration 100 in which data can be stored, and operations performed, in accordance with various embodiments. This configuration can include components offered as part of a multi-tenant environment, or resource provider environment 102, wherein the components are provided by a resource provider, and customers pay for access and/or utilization of respective portions of those resources. In this example configuration, the resource provider environment includes a number of racks 104, each rack including a number of host computing devices 106. The host computing systems 106 each host one or more virtual machines. Each virtual machine can act as an independent resource node for executing one or more program copies or performing another such action or process for user data requests, I/O operations, etc. This example configuration also includes computer systems that execute a block-based data storage system or service. The service can utilize a pool of multiple block-based data storage systems, which each have local block-based storage for use in storing one or more volumes 110. Access to the volume copies 110 is provided over an internal network to programs executing on various resource nodes. Thus, an application executing on a virtual machine instance on one of the computer systems 106 can be connected with one or more storage volumes 110 in the block based data storage systems. This is referred to herein as the instance being "attached" to the storage volume(s).

As illustrated, there is a first set of resources 104, 108 in a first location and a second set of resources 114, 116 in a second location (different logically and/or geographically from the first location). As mentioned later herein, there can be performance and cost benefits to having a virtual machine and connected data volumes in the same set of resources, as may utilize the same routing components, state information, network connections, and the like. Resources have limited capacity, however, and if the block based storage systems 108 in one set are full, then any additional volumes might have to be stored to block-based storage systems 116 of the other set. As mentioned, this can come with decreased performance and increased cost.

Accordingly, approaches in accordance with various embodiments attempt to relocate data volumes where possible in order to improve performance and cost. This can include, for example, moving data volumes from a first set of connected resources to a second set of connected resources, in order to increase the amount of available capacity in the first set of resources for data volumes to be attached to resources of the first set. If the data volumes are detached from current virtual machines, for example, and have not been accessed for at least a determined period of time, those volumes can potentially be snapshotted and moved to a separate storage service 118, for example, such as a Web-based persistent data storage service. The placement and movements can be determined and executed, at least in part, using a placement manager 112 or other such system or service.

In one example, a customer requesting to have a data storage volume allocated for use, as may receive input and/or output (I/O) instructions, will also have a virtual machine instance allocated that will be connected and/or attached to the instance. Other data volumes may exist in the resource provider environment that are not attached to virtual machine instances, and thus are unable to receive I/O through such resources. These detached volumes thus occupy space on the corresponding data server, for example, but do not contribute to the I/O performed by the server. A volume placed on a server takes up various resources and/or capacity from the server, including bytes, slots, IOPS, and throughput, among others. The IOPS and throughput resources apply for that volume only when there is at least some volume of I/O. An example server might have a capacity of 10,000 IOPS and a volume placed on that server might be configured with 1,000 IOPS. The volume thus could perform up to 1,000 IOPS such that the IOPS need to be allocated on that server for the volume. This leaves only 9,000 remaining IOPS of capacity on the server. If the volume is not actually performing any I/O operations, however, this results in unused capacity as the server could still actually handle 10,000 IOPS. Approaches in various embodiments may not count detached volumes into the IOPS equation, and thus can consider that the server is capable of holding volumes up to 10,000 instead of 9,000 IOPS, which helps to minimize unused capacity, which improves performance and reduces cost. There is a risk to such an approach, however, as the detached volume could be connected and/or attached any time by the customer. If all the volumes on a server get connected and drive at their maximum I/O allocation, the server will not be able to cater to all the demand. To protect against this, various approaches can reserve at least some IOPS for detached volumes, which still results in some unused capacity.

For optimal availability of data volumes, approaches in accordance with various embodiments can attempt to place a pair (or more) of data volume replicas in the same locality region, or in a location where the data volumes and connected virtual machine instance are in the same region of the resource provider network, where that region can utilize at least some of the same network infrastructure. Such placement can provide protection against network events, and as the resources are connected locally the overall performance is improved due to a decreased number of network "hops" between the instance and the data volumes.

To ensure that volumes are able to be placed in such a locality with the connected virtual machine instance, sufficient capacity should be available to connect enough servers, or other such resources, to the locality. In cases where volumes are not able to be placed in such a locality with the respective instances due to capacity constraints, at least some of the detached volumes can advantageously be moved to another network locality in order to make room for the attached volumes, which can improve performance and reduce cost as discussed previously. The detached volumes can not only be moved to other local network topologies, but in at least some embodiments can also be moved to lower cost storage. For example, a snapshot can be taken of the data volume and that snapshot could be stored to a separate storage service 118, or even lower cost storage (i.e., solid state, magnetic, or optical) in the same service. In such instances, one or both volume replicas can potentially be removed from the block-based storage system. In some embodiments one of the volumes can be kept in the block-based storage system in order to allow for a faster connection if a customer subsequently requests a connection to that volume for purposes of I/O. Such approaches can be used not only for detached volumes, but potentially for older volumes as well, where an attached volume that has not been accessed for a minimum period of time might have at least one replica moved to cheaper storage, or at least moved to a location that provided for additional capacity in a current location.

Figure 2:
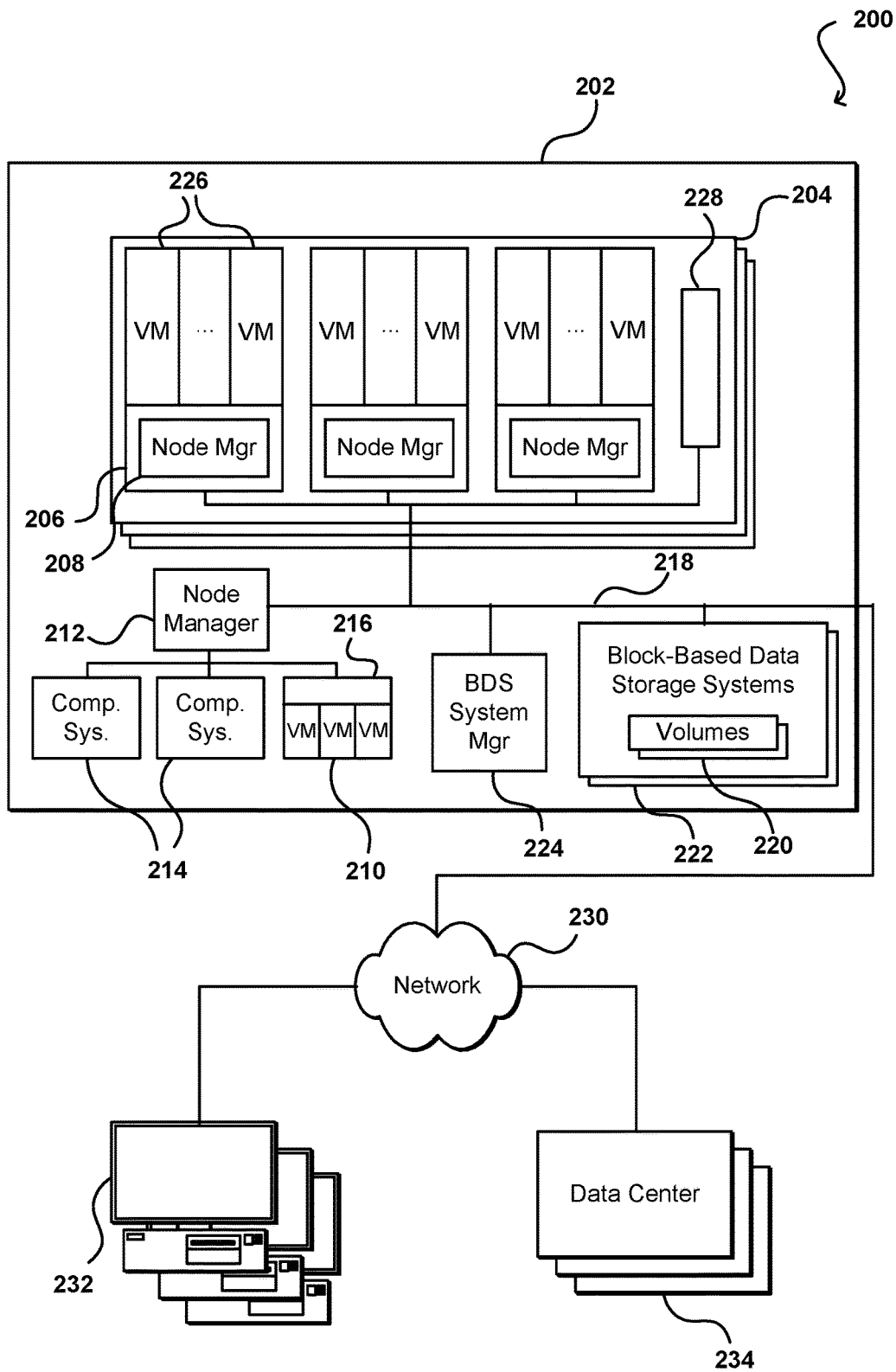
FIG. 2 illustrates an example environment in which aspects of the various embodiments can be implemented.

FIG. 2 illustrates an example network configuration 200 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 202 includes a number of racks 204, each rack including a number of host computing devices 206, as well as an optional rack support computing system 228 in this example embodiment. The host computing systems 206 on the illustrated rack 204 each host one or more virtual machines 226 in this example, as well as a distinct node manager module 212 associated with the virtual machines on that host computing system to manage those virtual machines. One or more other host computing systems 216 may also each host one or more virtual machines 210 in this example. Each virtual machine 210 may act as an independent resource node for executing one or more program copies or performing another such action or process for user data requests, I/O operations, etc. In addition, this example data center 202 further includes additional host computing systems 214 that do not include distinct virtual machines, but may nonetheless each act as a resource node for one or more tasks being executed for a user. In this example, a node manager module 212 executing on a computing system (not shown) distinct from the host computing systems 214 and 216 is associated with those host computing systems to manage the resource nodes provided by those host computing systems, such as in a manner similar to the node manager modules 208 for the host computing systems 206. The rack support computing system 228 may provide various utility services for other computing systems local to its rack 204 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 202 also includes a computing system 224 that executes a block-based data storage ("BDS") system manager module for the block-based data storage service to assist in managing the availability of non-local block-based data storage to programs executing on resource nodes provided by the host computing systems located within the data center (or optionally on computing systems located in one or more other data centers 234, or other remote computing systems 232 external to the data center). In particular, in this example the data center 202 includes a pool of multiple block-based data storage systems 222, which each have local block-based storage for use in storing one or more volume copies 220. Access to the volume copies 220 is provided over the internal network(s) 218 to programs executing on various resource nodes 210 and 214. As discussed in greater detail elsewhere, a block-based data storage system manager module 224 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS system manager module 222 may coordinate with the node manager modules 212, 208 to manage use of volumes by programs executing on associated resource nodes, while in other embodiments the node manager modules may not be used to manage such volume use. In addition, in other embodiments, one or more BDS system manager modules 224 may be structured in other manners, such as to have multiple instances of the BDS system manager executing in a single data center (e.g., to share the management of non-local block data storage by programs executing on the resource nodes provided by the host computing systems located within the data center), and/or such as to have at least some of the functionality of a BDS system manager module being provided in a distributed manner by software executing on some or all of the server block data storage systems 222 (e.g., in a peer-to-peer manner, without any separate centralized BDS system manager module on a computing system 224).

In this example, the various host computing systems, server block data storage systems, and computing systems are interconnected via one or more internal networks 218 of the data center, which may include various networking devices (e.g., routers, switches, gateways, etc.) that are not shown. In addition, the internal networks 218 are connected to an external network 230 (e.g., the Internet or another public data network) in this example, and the data center 202 may further include one or more optional devices (not shown) at the interconnect between the data center and an external network (e.g., network proxies, load balancers, network address translation devices, etc.). In this example, the data center 202 is connected via the external network 230 to one or more other data centers 234 that each may include some or all of the computing systems and storage systems illustrated with respect to data center 202, as well as other remote computing systems 232 external to the data center. The other computing systems 232 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 122 may further be interconnected with one or more other networks or other connection mediums, such as a high-bandwidth connection over which the block-based storage systems 222 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 2 has been simplified for the purposes of explanation, and that the number and organization of host computing systems, server block data storage systems and other devices may be much larger than what is depicted in FIG. 2. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, then such a data center may execute as many as tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 2 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 2, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a BDS system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetachVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

In certain approaches, a customer requesting a data volume is not able to select or request a particular type of volume, or a particular type of performance. A customer is typically granted an amount of storage, and the performance follows a "best effort" type of approach, wherein customer requests are performed based on the capability, load, and other such factors of the system at the time of the request. Each customer is typically charged the same amount per unit measure, such as the same dollar amount per gigabyte of storage per month, as well as the same amount per number of I/O requests per month, charged in an amount such as in increments of millions of requests per month.

Figure 3:
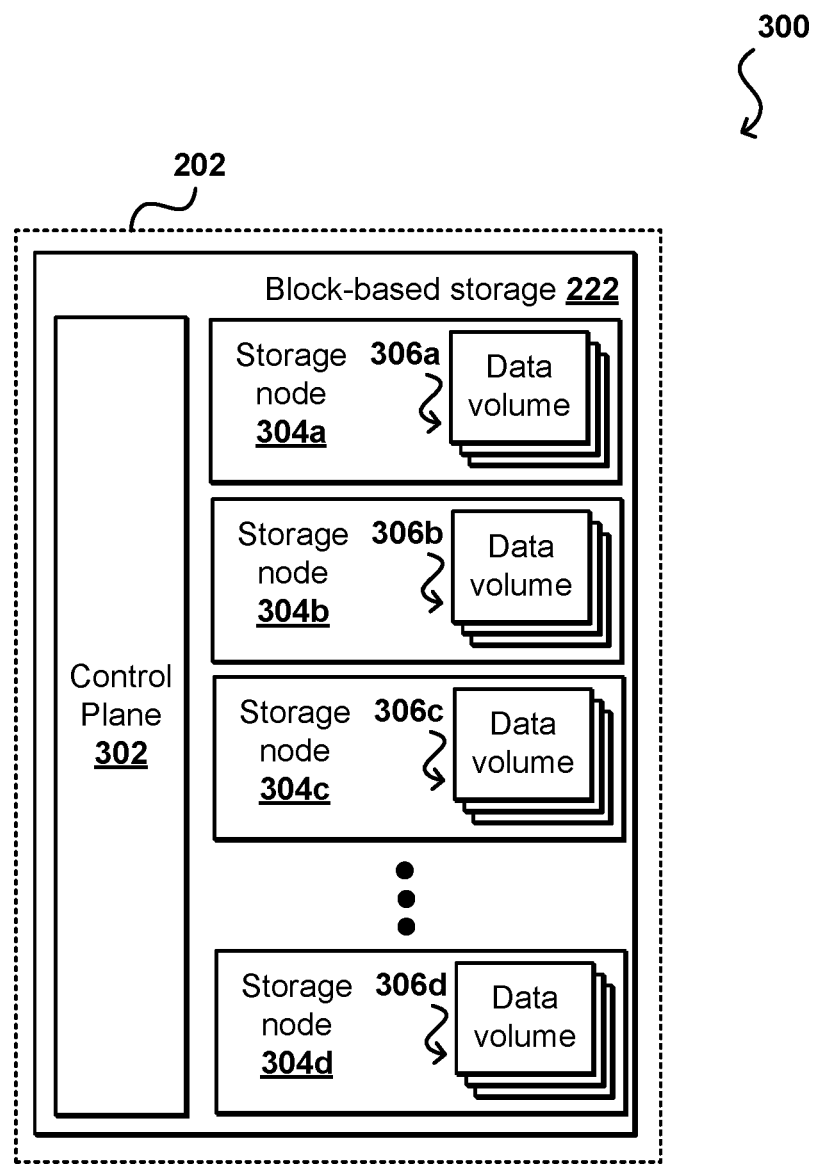
FIG. 3 illustrates components of an example block-based data storage service that can be utilized in accordance with various embodiments.

A block-based storage service provider can implement functionality such as page cache write logging and the dynamic modifying of durability properties for data volumes. FIG. 3 is a block diagram illustrating components of a provider environment 202 such as described with respect to FIG. 2. It should be understood that reference numbers may be carried over between figures for similar elements for purposes of simplicity of understanding, but that such usage should not be interpreted as a limitation on the various embodiments unless otherwise explicitly stated herein. Multiple network-based services can be implemented in such an environment, as may include a block-based storage service 222 in at least some embodiments. A provider environment 300, or other such multi-tenant or shared resource environment, may be set up by an entity such as a company or a public sector organization to provide one or more services (such as various types of cloud-based computing or storage) accessible via the Internet and/or other networks to clients. The provider environment 202 may include numerous data centers hosting various resource pools, such as collections of physical and/or virtualized computer servers, storage devices, networking equipment and the like, used to implement and distribute the infrastructure and services offered by the provider environment 202. In some embodiments, the provider environment 202 may provide computing resources, such as virtual compute services, storage services, and/or any other type of network-based services. Clients can access these various services offered by the provider environment over an appropriate network. Likewise, network-based services may themselves communicate and/or make use of one another to provide different services. For example, computing resources can be offered to clients in units called "instances," such as virtual or physical compute instances or storage instances, that make use of particular data volumes, providing virtual block storage for the compute instances.

In various embodiments, the provider environment 202 implements a block-based storage 222 system or service for performing storage operations. The example block-based storage 222 is a storage system, composed of a pool of multiple independent storage nodes 304a, 304b, 304c through 304n (e.g., server block data storage systems), which provide block level storage for storing one or more sets of data volumes 306a, 306b, 306c, through 306n. The data volumes 306 can be mapped to particular clients, providing virtual block-based storage (e.g., hard disk storage or other persistent storage) as a contiguous set of logical blocks. In some embodiments, a data volume 306 may be divided up into multiple data chunks (including one or more data blocks) for performing other block storage operations, such as snapshot operations or replication operations.

A volume snapshot of a data volume 306 may be a fixed point-in-time representation of the state of the data volume. In some embodiments, volume snapshots may be stored remotely from a storage node 304 maintaining a data volume 306, such as in another storage service. Snapshot operations may be performed to send, copy, and/or otherwise preserve the snapshot of a given data volume in another storage location, such as a remote snapshot data store in another storage service.

A block-based storage service 222 can implement a block-based storage service control plane 302 to assist in the operation of the block-based storage service 222. In various embodiments, the block-based storage service control plane 302 assists in managing the availability of block data storage to clients, such as programs executing on compute instances provided by a virtual compute service and/or other network-based services located within the provider environment 202 and/or optionally computing systems (not shown) located within one or more other data centers, or other computing systems external to the provider network and available over at least one network. Access to the data volumes 306 may be provided over an internal network within the provider network 202 or externally via an appropriate network, in response to block data transaction instructions.

A block-based storage service control plane 302 can provide a variety of services related to providing block level storage functionality, including the management of user accounts (e.g., creation, deletion, billing, collection of payment, etc.). The block-based storage service control plane 302 may further provide services related to the creation, usage and deletion of data volumes 306 in response to configuration or other such requests. The block-based storage service control plane 302 can also provide services related to the creation, usage, and deletion of volume snapshots on another storage service. The block-based storage service control plane 302 may also provide services related to the collection and processing of performance and auditing data related to the use of data volumes 306 and snapshots of those volumes.

The provider environment 202 may also implement other storage services, as noted above. Another storage service may provide a same or different type of storage as provided by the block-based storage service 222. For example, in some embodiments another storage service may provide an object-based storage service, which may store and manage data as data objects. For example, volume snapshots of various data volumes 306 may be stored as snapshot objects for a particular data volume 306. In addition to another storage service, the provider environment 202 may implement other network-based services, which can include various different types of analytical, computational, storage, or other network-based system allowing clients, as well as other services of the provider environment (e.g., a block-based storage service, virtual compute service, and/or other storage service) to perform or request various tasks.

Client devices capable of interacting with the provider environment can encompass any type of device configurable to submit requests to the network environment 202. For example, a given client may include a suitable version of a Web browser, or may include a plug-in module or other type of code module configured to execute as an extension to, or within, an execution environment provided by a Web browser. Alternatively, a client may encompass an application such as a database application (or user interface thereof), a media application, an office application or any other application that may make use of compute instances, a data volume 306, or other network-based service in the provider environment 302 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients may be configured to generate network-based service requests. In some embodiments, a client (e.g., a computational client) may be configured to provide access to a compute instance or data volume 306 in a manner that is transparent to applications implemented on the client, utilizing computational resources provided by the compute instance or block storage provided by the data volume 306.

Client devices can convey network-based services requests to the provider environment via an external network. In various embodiments, the external network may encompass any suitable combination of networking hardware and protocols necessary to establish network-based communications between the client devices and the provider environment. For example, a network may generally encompass the various telecommunications networks and service providers that collectively implement the Internet. A network may also include private networks such as local area networks (LANs) or wide area networks (WANs) as well as public or private wireless networks. For example, both a given client device and provider network may be respectively provisioned within enterprises having their own internal networks. In such an embodiment, a network may include the hardware (e.g., modems, routers, switches, load balancers, proxy servers, etc.) and software (e.g., protocol stacks, accounting software, firewall/security software, etc.) necessary to establish a networking link between a given client device and the Internet, as well as between the Internet and the provider environment. It is noted that in some embodiments, the clients may communicate with provider environment 202 using a private network rather than the public Internet.

Figure 4:
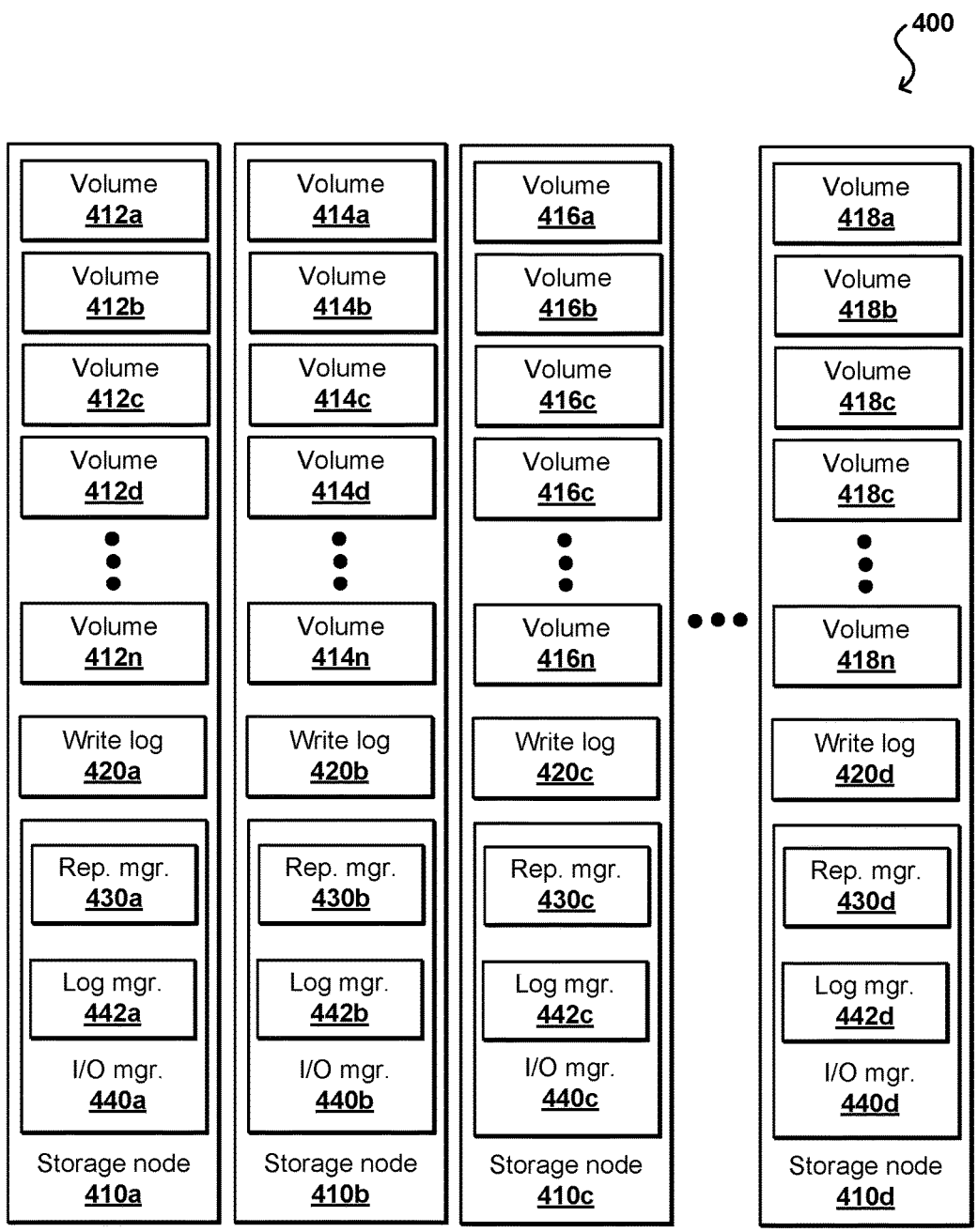
FIG. 4 illustrates a set of storage nodes that can be utilized in accordance with various embodiments.

FIG. 4 is a block diagram 400 illustrating storage nodes that implement write logs for updates to page caches implemented at the storage nodes and dynamically modifying durability properties for data volumes, according to some embodiments. Multiple storage nodes, such as storage nodes 410*a*, 410*b*, 410*c*, through 410*n* may be implemented in order to provide block-based storage services. A storage node 410 can comprise one or more computing systems or devices, such as a storage server or other such computing system or device. Each storage node 410 can maintain respective replicas of data volumes. For instance, a first storage node 410*a* maintains a set of data volumes 412, while storage nodes 410*b* through 410*d* maintain other data volumes 414, 416, 418, respectively. While the example storage nodes 410 are depicted as having equal numbers of data volumes, numbers of data volumes maintained on storage nodes may vary between storage nodes. Some data volumes may also differ in size from other data volumes, in some embodiments. In addition, some data volumes may be split, or partitioned, into different segments, such that multiple storage nodes, such as storage node 410*a* and 410*b*, store different segments of a storage volume. A storage volume may be partitioned into any number of segments. Storage nodes 410 can be used to provide multi-tenant storage. For example, in some embodiments a data volume 416*a* maintained at a storage node 410*c* may be maintained for one account of the block-based storage service, while a different data volume 416*b* also maintained at the same storage node 410*c* may be maintained for a different account. Storage nodes 410 can persist their respective data volumes in one or more block-based storage devices (e.g., hard disk drives, solid state drives, etc.) that may be directly attached to a computing system or device implementing the respective storage node.

In various embodiments, storage nodes 410 may each implement at least one respective page cache. A page cache can be a portion of system memory or other memory device that stores pages or other groupings of data from one of the data volumes 412 maintained a respective storage node 410. Instead of directly writing to or reading from a block-based storage device maintaining the portion of requested data of a data volume, the page cache may be updated. For example, if a read request is received for a portion of a data volume, it may first be determined whether the data resides in the page cache. If the data resides in the page cache then the data may be read from cache. If not, the data may be retrieved from the respective block-based storage device maintaining the portion of the requested data of the data volume and written into the page cache for future use. Similarly, a write request may be directed toward a data volume maintained in persistent block storage may be first completed at the page cache. For a received write request, a page cache entry corresponding to the data to be written (e.g., a portion of a data volume already maintained in the page cache) may be updated according to the write request. Similarly, if the data to be modified by the write request is not in the page cache, the data may be first obtained from the block-based storage device that persists the data, written into a new page cache entry in the page cache, and then updated according to the write request. Page cache techniques are well-known to those of ordinary skill in the art, and thus, the previous examples are not intended to be limiting as to other page cache techniques.

In various embodiments, the storage nodes 410 can implement respective write logs 420. Write logs, for example page cache write logs, may store log records describing updates to the respective page cache, such as write requests that modify data maintained in a page cache. Thus, in the event of a system or other failure that causes a loss of data in the page cache, log records in the write log 420 can be used to restore the page cache to a state prior to the failure. Log records may be stored sequentially according to the order in which updates are made to page cache, in some embodiments. By storing log records sequentially, log records may be replayed or re-applied in the order in which they are stored to generate a state of the page cache at a particular point in time. The storage nodes 410 can also implement respective input/output ("I/O") managers 440. The I/O managers 440 may handle I/O requests directed toward data volumes maintained at a particular storage node. Thus, an I/O manager 440b can process and handle a write request to a volume 414b at a particular storage node 410b, for example. An I/O manager 440 can be configured to process I/O requests according to block-based storage service application programming interface (API) and/or other communication protocol(s), such as such as the Internet small computer system interface (iSCSI) protocol. In some embodiments, I/O managers 440 implement respective log management components 442 and replication management components 430. The log management components can perform various log management functions, such as trimming log records and/or performing page cache recovery based, at least in part, on log records. The replication management components can perform various tasks, as discussed herein, related to volume replication.

A block-based storage service can manage and maintain data volumes in a variety of different ways. Different durability schemes may be implemented for some data volumes among two or more storage nodes maintaining a same replica of a data volume. For example, different types of mirroring and/or replication techniques may be implemented (e.g., RAID 1) to increase the durability of a data volume, such as by eliminating a single point of failure for a data volume. In order to provide access to a data volume, storage nodes may then coordinate I/O requests, such as write requests, among the two or more storage nodes maintaining a replica of a data volume. For example, for a given data volume 412a, a storage node 410a may serve as a master storage node. A master storage node may, in various embodiments, receive and process requests (e.g., I/O requests) from clients of the data volume. Thus, storage node 410a may then coordinate replication of the I/O requests, such as write requests, or any other changes or modifications to the data volume 412a to one or more other storage nodes serving as slave storage nodes. For instance, a storage node 410c may maintain a data volume 416d which is a replica of another data volume 412a. Thus, when a write request is received for the data volume 412a at the master storage node 410a, the master storage node 410a can be configured to forward the write request to the slave storage node 410c and wait until the slave storage node 410c acknowledges the write request as complete before completing the write request at the storage node 410. Master storage nodes may direct other operations for data volumes, like snapshot operations or other I/O operations (e.g., serving a read request). It should be noted that, in some embodiments, the role of master and slave storage nodes may be assigned per data volume. For example, for a data volume 412a maintained at a first storage node 410a, that first storage node 410a may serve as a master storage node. While for another data volume, such as data volume 412b, maintained at storage node 410a, the storage node 410a may serve as a slave storage node.

In some embodiments, data volumes are replicated with two copies. A replication protocol can be used that can make both copies of a volume deterministically consistent, and that is agnostic to features on the server that use replication for durability like snapshots. This can greatly simplify the replication protocol itself since there can be fewer custom messages, and can allow various other distributed features to be built on a server using replication without ever having to touch the replication protocol.

In various embodiments, data storage volumes can be presented as block devices to customers, addressable via read/write requests using an offset, length, and data. As mentioned, the data volume can be stored on a server as a type of persistent key-value store. In some embodiments, the storage on a server can be divided into portions, such as a log partition and a data partition. The log partition can consist of one or more devices, such as fast solid state drives (SSDs), with an appropriate log interface. The data partition can consist of a logical striping across a number of SSDs or magnetic drives, for example, and can present a block interface that can be written to randomly in at least some embodiments. There can be one log and one data partition per server. It at least some embodiments the writes first go to the log and then can later be written to the data partition.

A note for a customer write operation can contain information such as the offset for the write, the length, the operation number, and the data itself. The volume can map this to a key, value, data-reference store using an appropriate schema. One such schema includes a volume key, which can be a prefix to distinguish customer data, customer offset, and operation number. The schema can also include a volume value, which can refer to the data length, and a volume data reference, which can be a pointer to the location of the data. The volume storage engine can also support flushing of the data from the log to the appropriate data partition. Notes for customer writes include the data, such that all incoming writes can be written to the log. To free up space in the log, the storage server can periodically read the data reference and the associated data, write that data to the data partition, and replace the data reference with a pointer to a location on the data partition instead of the log. This enables that data to be removed from the log. This flushing can be performed done asynchronously, enabling multiple customer writes to be merged together.

As mentioned, in many instances it will be desirable to replicate various data volumes. A replication process can be responsible for ensuring that both copies of the volume are the same and that all changes are applied in the same order on each copy. The replication techniques discussed herein track these updates as operations. The operations can include, for example, customer writes and metadata updates such as volume provisioned input/output operations per second (IOPS), volume leases, and snapshot metadata. Each operation in at least some embodiments will have an ever-increasing operation number assigned, and the volume can be uniquely described by the sequence of operations. The replication process can guarantee that both copies have the same sequence of operations and will be executed in the same order.

Figure 5:
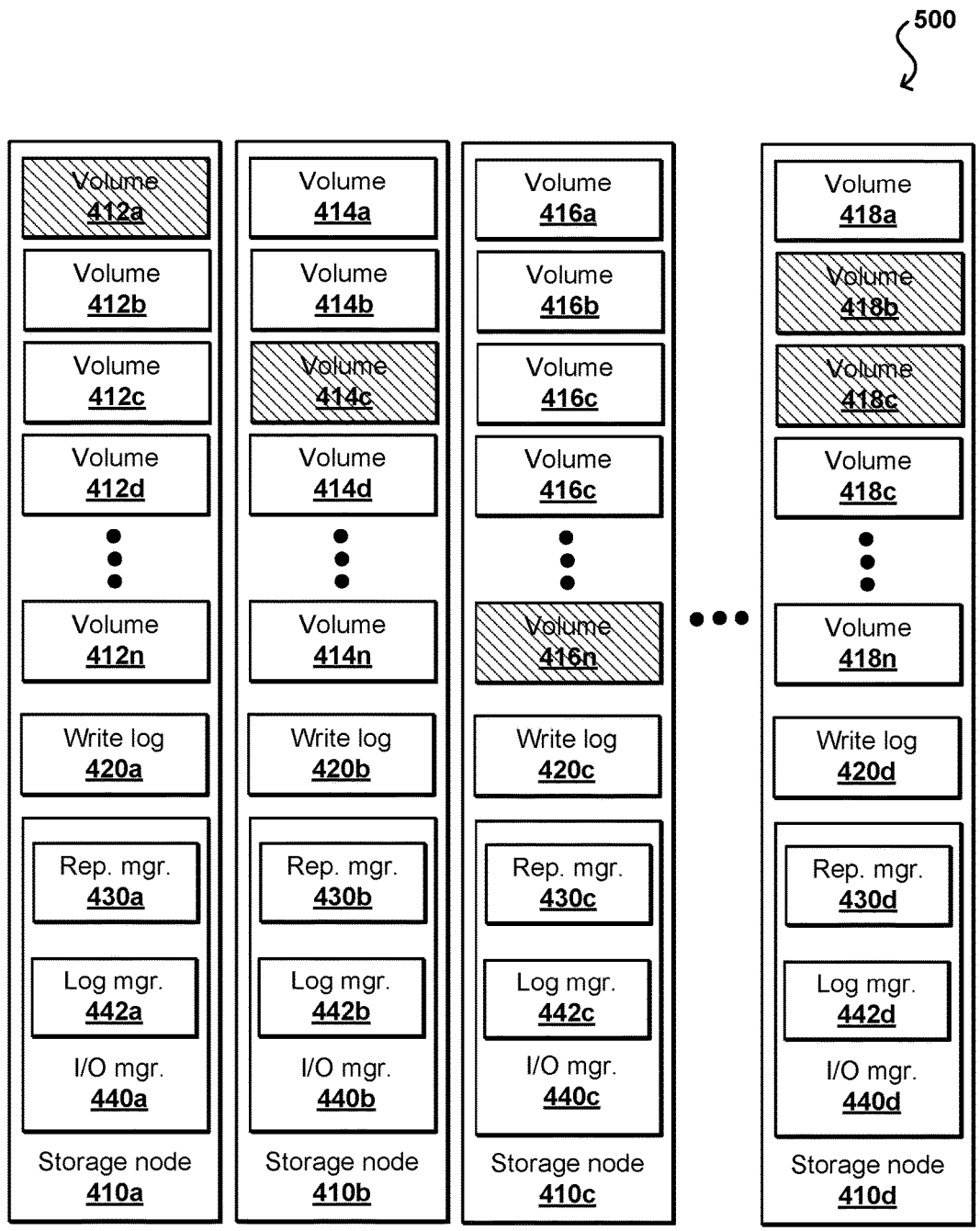
FIG. 5 illustrates a set of storage nodes where some of the volumes hosted by those nodes are not attached or connected to an active virtual machine instance that can be utilized in accordance with various embodiments.

FIG. 5 illustrates another view 500 of a set of storage nodes 500 that can be utilized in accordance with various embodiments. In this example, there are a number of data volumes that are not attached to servers (or other such components) in the resource provider environment, and thus are currently unable to serve I/O for those servers. These volumes 412a, 414c, 416n, 418b, 418c are represented by the patterned boxes in the figure. As mentioned, these volumes could potentially be re-attached to a server such that they could serve I/O, and thus count against the available capacity on the various nodes. In this example, the nodes are all connected (persistently) to a network locality with shared state and interconnect, such that these detached volumes are taking up capacity that could more advantageously be allocated to data volumes attached to servers of the network locality, which could improve performance and reduce cost. Thus, it can be desirable in at least some embodiments to move these detached data volumes, or at least one of a replicated data volume pair, to a different location in the resource provider environment. As mentioned, this can include another network locality that has available capacity and/or less demand, or to a separate storage service or facility, among other such options. In at least some embodiments a resource localization algorithm can be used that attempts to maximize the number of connected components that are contained within the same network locality, such as by determining requirements and connections and moving components between localities as appropriate.

In some embodiments, each data volume can have two replicas on different servers on different racks, which can be separate from the rack housing the server hosting the corresponding virtual machine instance. It can be desirable in such embodiments for the three servers to all be connected to the same network locality as discussed previously, such as to increase the availability of those volumes. Approaches in accordance with various embodiments thus can attempt to move, place, or relocate data volumes as appropriate to attempt to move toward such a configuration across the network.

Figure 6:
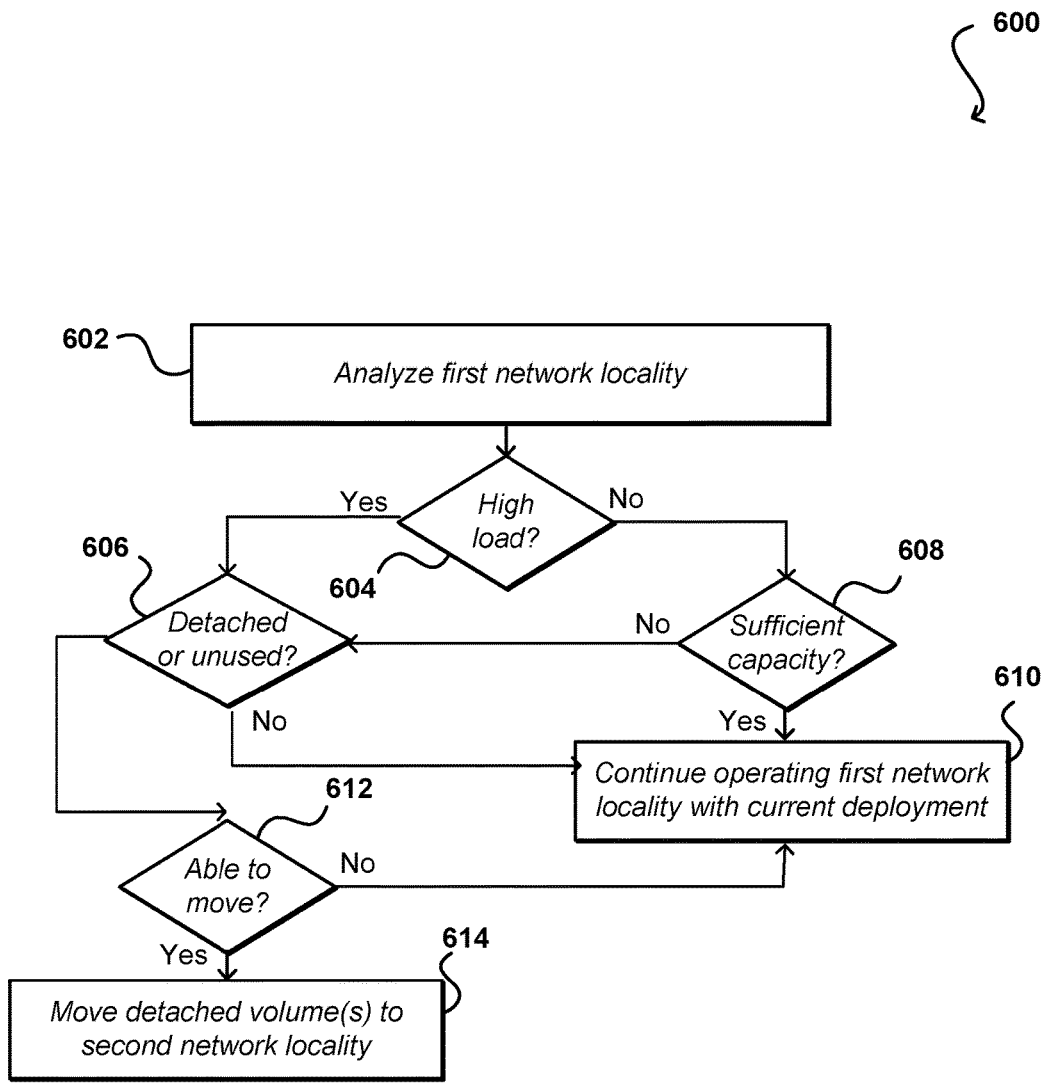
FIG. 6 illustrates an example process for determining whether to move a data volume from a first local network locality that can be utilized in accordance with various embodiments.

FIG. 6 illustrates an example process 600 for relocating data volumes in a multi-tenant environment that can be utilized in accordance with various embodiments. It should be understood for the various processes described herein that additional, fewer, or alternative steps can be performed in similar or alternative orders, or in parallel, within the scope of the various embodiments unless otherwise stated. In this example, a first network locality is analyzed 602. This could be in response to a request to check capacity, as part of an ongoing monitoring, in response to a request to create one or more volumes in the network locality, etc. In at least some embodiments a determination can be made 604 as to whether the first network locality has a high load, request, or processing volume such that it would be advantageous to free up capacity. If not, a determination can be made 608 as to whether there is sufficient capacity available in the first network locality, such as a minimum or target amount of capacity. This can include, for example, determining whether a data server exists in the first network locality with sufficient available capacity, such as storage capacity and available IOPS, among others. If the network locality is a high load locality or has insufficient capacity, an attempt can be made to move some of data volumes. In some embodiments these attempts can be made regardless of load as well.

If an attempt is to be made to free up capacity, a determination can be made 606 as to whether there is at least one detached volume, or attached volume that has not been accessed for at least a minimum or threshold period of time, that could advantageously be moved from the first network locality. If not, or if the first network locality already has sufficient capacity, then the first network locality can continue 610 to operate with the current deployment, allocation, and/or placement. If there is at least one detached or unused data volume, a determination can be made 612 as to whether one or more of those volumes can be moved (or otherwise modified), as well as whether this would provide adequate capacity for new volumes in at least some embodiments. If so, one or more of the volumes can be moved 614 from the first network locality, such as is discussed with respect to the process of FIG. 7.

Figure 7:
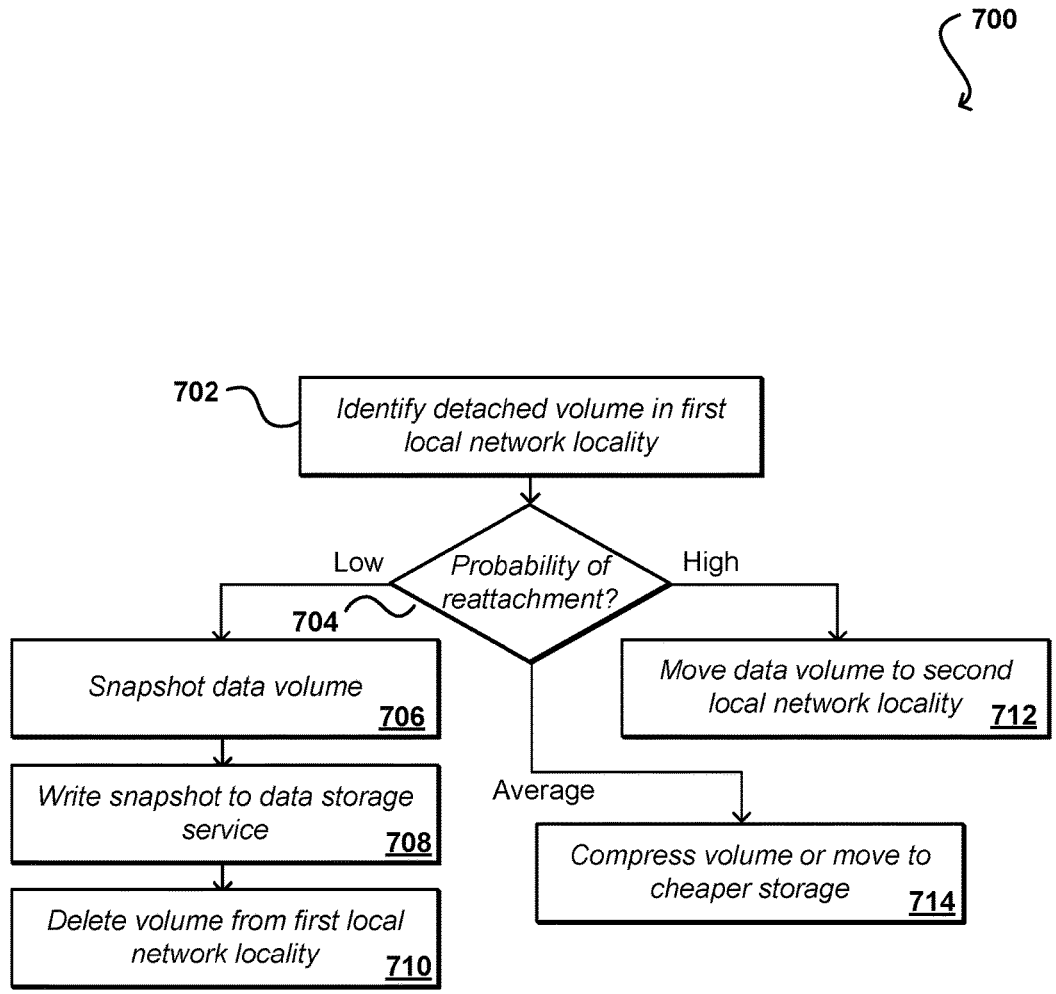
FIG. 7 illustrates an example process for determining how to move a data volume that can be utilized in accordance with various embodiments.

FIG. 7 illustrates an example process 700 for moving a data volume that can be utilized in accordance with various embodiments. As mentioned with respect to the example process of FIG. 6, at least one detached volume can be identified 702 in a first network locality that would advantageously be moved or otherwise modified. This can include, for example, a redundant data volume of a data volume pair or a standalone data volume, among other such options. In some embodiments the approach used for a redundant copy will depend in part upon whether a copy remains in the first network locality or another network locality, among other such factors as discussed and suggested herein. In this example, a determination is made 704 as to a probability that a detached volume will be reattached, or for unused volumes the probability that the volume will receive additional I/O over some future period of time. The probability can be calculated in any appropriate way, such as may be based on historical information, as may be specified by a provider of the multi-tenant environment or other such authorized entity. If the probability is low, such as below a first specified probability threshold, in this example a snapshot (or other view) of the data volume can be captured 706 and written 708 to a specified data storage service or other such system or location, from which the data can be retrieved if the volume is to again be attached. Once it is confirmed that the snapshot is properly and completely stored by the storage service, the data volume (or at least one of the copies of the volume) can be deleted from the first network locality. If probability is high, such as above a second probability threshold, the data volume can be moved 712 to a second network locality that has more capacity, is under less demand, or would more advantageously host the identified data volume. Such an approach can help to obtain network locality, thereby improving performance and reducing cost. As mentioned, in some embodiments the placement decision can also take into account the cost of storage, where one data volume might remain in a network locality but be moved from a solid state drive to magnetic or optical storage, or vice versa. In this example, a determination that there is an average probability of reattachment or reuse, such as a probability between the first and second thresholds, then the data volume can be compressed and/or moved to less expensive storage, such as SSD, magnetic, or optical storage, among other such options.

In some embodiments a placement manager or other such component can monitor demand at the network locality level and determine whether various data volumes should be moved from the locality to improve performance. A placement manager can determine which topologies are the most demanding or utilized, and then attempt to move data volumes (detached or less accessed) to other topologies as allowed by various rules or policies, etc. While various embodiments analyze the current load, other embodiments also analyze trends and expected usage to attempt to ensure sufficient capacity is available over an upcoming period of time. In some embodiments a placement service recommends servers for placement, but an active placement service makes the actual decision as far as which volumes to move and where to move them, among other such decisions. Optimizing a server fleet for attached volumes, where I/O is important for customers, does not affect customers with detached volumes, particularly where a decision can be made to keep both, one of, or no data volume replicas in the system. As mentioned, various rules, policies, or types of users can be managed by introducing tiering, for example, whereby certain customers can pay extra to ensure that their data volumes are always available for connection and not snapshotted to a separate storage service, or always have redundant copies available for connection, among other such options. Further, in some embodiments at least some amount of detached data volume can be allowed on a server without counting the unused capacity against the available capacity of the server as discussed and suggested elsewhere herein.

Figure 8:
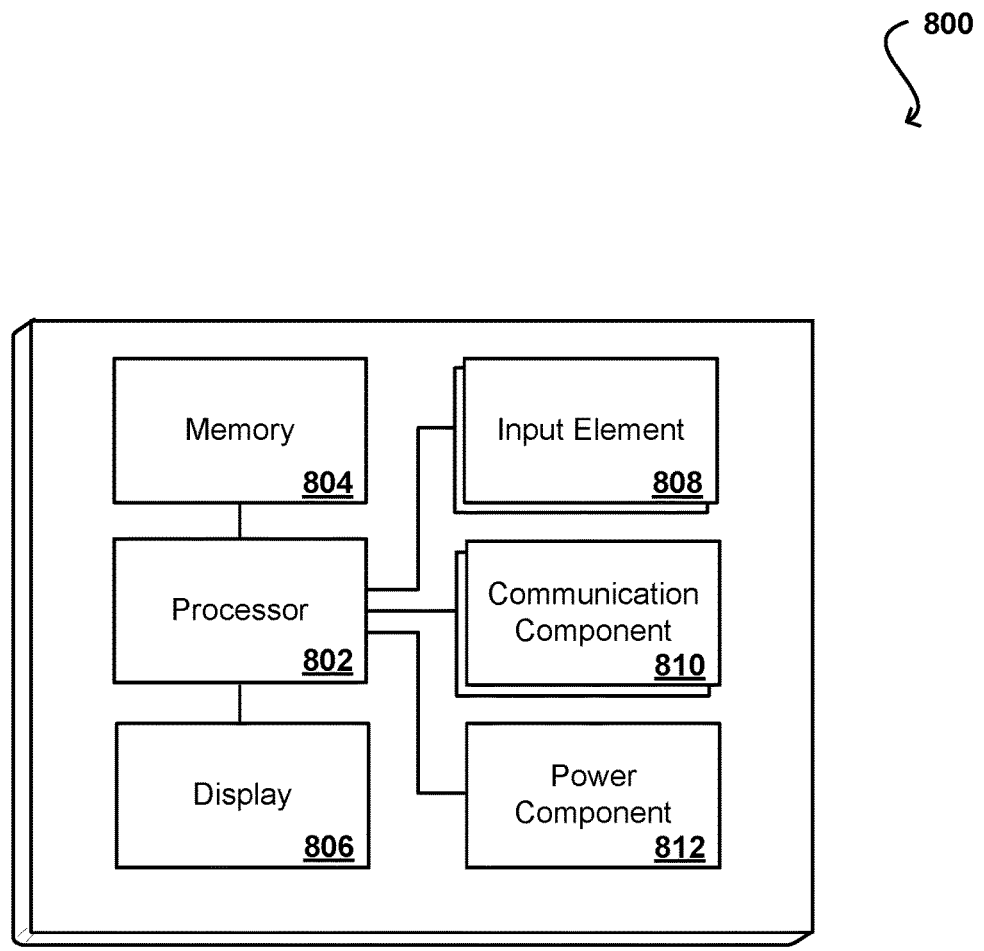
FIG. 8 illustrates components of an example computing device that can be used to perform aspects of the various embodiments.

FIG. 8 illustrates a logical arrangement of a set of general components of an example computing device that can be used to implement aspects of the various embodiments. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device may include some type of display element 806, such as a touch screen or liquid crystal display (LCD), although devices such as portable media players might convey information via other means, such as through audio speakers. In some embodiments, the computing device 800 can include one or more networking and/or communication elements 808, such as a Wi-Fi, Bluetooth, RF, wired, or wireless communication system. The device in many embodiments can communicate with a network, such as the Internet, and may be able to communicate with other such devices. In some embodiments the device can include at least one additional input component 810 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The device will also include one or more power components 812, such as a power source, battery compartment, wireless charging circuitry, and the like, for providing and/or obtaining the power needed for the computing device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable non-transitory media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
analyzing capacity for a first network locality in a multi-tenant environment, the first network locality including a first subset of resources sharing state information and network interconnection, the first subset of resources including at least one server hosting a virtual machine for serving input and output (I/O) operations for at least one data volume;
identifying a detached data volume hosted by the first subset of resources, the detached data volume disconnected from a corresponding virtual machine for serving I/O operations;
determining that a probability of the data volume being reattached to the corresponding virtual machine is above a specified probability threshold;
determining sufficient capacity for the detached data volume in a second subset of resources corresponding to a second network locality;
causing, by a placement management service, the detached data volume to be hosted by the second subset of resources;
receiving, by a placement management service, a request to place a new data volume in the multi-tenant environment;
causing, by the placement management service, the new data volume to be hosted by the first subset of resources where the corresponding virtual machine for serving I/O operations for the new data volume is provided by the first subset of resources; and
attaching the new data volume to the corresponding virtual machine in the first subset of resources, wherein the new data volume is capable of serving I/O operations for the corresponding virtual machine within the first subset of resources corresponding to the first network locality.

2. The computer-implemented method of claim 1, further comprising:
identifying a second detached data volume in the first subset of resources;
capturing a data snapshot for the second detached data volume;
storing the data snapshot to a data storage service; and
deleting the second detached data volume from the first subset of resources.

3. The computer-implemented method of claim 2, further comprising:
determining that the second detached data volume has a probability of being reattached that is less than a second probability threshold; and
determining to store the data snapshot to the data storage service instead of moving the second detached data volume to a separate subset of resources corresponding to a separate network locality.

4. The computer-implemented method of claim 3, further comprising:
causing a third data volume to be one of moved to the separate subset of resources, moved to a less expensive set of resources, compressed, or stored as a snapshot to the data storage service in response to determining a probability of processing subsequent I/O operations is less than the second probability threshold even though the third data volume is attached to the corresponding virtual machine.

5. The computer-implemented method of claim 1, further comprising:
causing a redundant copy of the detached data volume to remain hosted by the first subset of resources.

6. A computer-implemented method, comprising:
determining a reduction in allocated capacity for a first subset of resources in a multi-tenant environment, the first subset of resources corresponding to a first locality sharing state information;
identifying a data volume hosted by the first subset of resources that is at least one of detached from an accessing resource or has remained unaccessed by the accessing resource for at least a specified period of time;
determining an availability, in a second subset of resources in the multi-tenant environment, to host the data volume, the second subset of resources corresponding to a second locality sharing state information;
causing the data volume to be moved to the second subset of resources when a probability of reattachment is above a specified threshold or the data volume has remained unaccessed for longer than a threshold period of time; and
causing a redundant copy of the detached data volume or the unaccessed data volume to remain hosted by the first subset of resources.

7. The computer-implemented method of claim 6, further comprising:
determining the reduction in allocated capacity to be performed based at least in part upon an instruction from capacity monitoring service or in response to a current load on the first locality.

8. The computer-implemented method of claim 6, further comprising:
identifying a second data volume hosted by the first subset of resources;
capturing a data snapshot for the second data volume; and
storing the data snapshot to a data storage service.

9. The computer-implemented method of claim 6 further comprising:
determining that a third data volume has a probability of processing subsequent I/O operations that is below a specified probability threshold; and
determining to compress the third data volume, move the third data volume to cheaper storage, or store a data snapshot for the third data volume to the data storage service instead of moving the third data volume to a separate subset of resources corresponding to a separate locality.

10. The computer-implemented method of claim 6, further comprising:
monitoring the allocated capacity for the first subset of resources and the second subset of resources in the multi-tenant environment; and
moving one or more additional data storage volumes between the first subset and the second subset according to a resource localization algorithm.

11. The computer-implemented method of claim 6, further comprising:
enabling at least one allocated capacity value to exceed a maximum allocatable capacity where at least a portion of the at least one allocated capacity value corresponds to a detached data storage volume unable to process I/O commands in the multi-tenant environment.

12. The computer-implemented method of claim 6, wherein the data storage volume is stored to a block-based storage system of the first subset of resources.

13. The computer-implemented method of claim 6, further comprising:
  causing an additional data storage volume to be at least one of compressed or moved to a cheaper type of network storage among the first subset of resources.

14. The computer-implemented method of claim 6, wherein the allocated capacity includes at least one of storage capacity, throughput, or I/O per second (IOPS).

15. The computer-implemented method of claim 6, further comprising:
  determining the reduction in allocated capacity to be performed based upon at least one of a current load or an expected load over a future period of time.

16. A system, comprising:
  at least one processor; and
  memory including instructions that, when executed by the at least one processor, cause the system to:
    determine a reduction in allocated capacity to be performed for a first subset of resources in a multi-tenant environment, the first subset of resources corresponding to a first network locality sharing network interconnection;
    identify a data volume hosted by the first subset of resources that is detached from an accessing resource of the first subset;
    determine an availability, in a second subset of resources in the multi-tenant environment, to host the data volume, the second subset of resources corresponding to a second network locality sharing network interconnection;
    cause the data volume to be moved to the second subset of resources when a probability of reattachment is above a specified threshold; and
    cause a redundant copy of the detached data volume to remain hosted by the first subset of resources.

17. The system of claim 16, wherein the instructions when executed further cause the system to:
  determine the reduction in allocated capacity to be performed based at least in part upon an instruction from capacity monitoring service or in response to a current load on the first network locality.

18. The system of claim 16, wherein the instructions when executed further cause the system to:
  identify a second data volume hosted by the first subset of resources;
  capture a data snapshot for the second data volume;
  store the data snapshot to a data storage service; and
  delete the second data volume from the first subset of resources.

19. The system of claim 18, wherein the instructions when executed further cause the system to:
  determine that a third data volume has a probability of processing subsequent I/O operations that is below a specified probability threshold; and
  determine to compress the third data volume, move the third data volume to cheaper storage, or store a data snapshot for the third data volume to the data storage service instead of moving the third data volume to a separate subset of resources corresponding to a separate network locality.

20. The system of claim 16, wherein the instructions when executed further cause the system to:
  cause an additional data storage volume to be at least one of compressed or moved to a cheaper type of network storage among the first subset of resources.

* * * * *